United States Patent
McInerney et al.

(10) Patent No.: US 6,919,005 B2
(45) Date of Patent: Jul. 19, 2005

(54) CONFIGURATION AND ELECTRO-OSMOTIC PULSE (EOP) TREATMENT FOR DEGRADING POROUS MATERIAL

(75) Inventors: Michael K. McInerney, Champaign, IL (US); Vincent F. Hock, Mahomet, IL (US); Philip Chitty, Dayton, OH (US); Stephen N. Flanders, Norwich, VT (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 453 days.

(21) Appl. No.: 10/140,875

(22) Filed: May 9, 2002

(65) Prior Publication Data

US 2003/0209437 A1 Nov. 13, 2003

(51) Int. Cl.⁷ ............................................. C25B 15/00
(52) U.S. Cl. ...................... 204/515; 204/600; 204/648
(58) Field of Search .............................. 204/515, 600, 204/648

(56) References Cited

U.S. PATENT DOCUMENTS

| | | | |
|---|---|---|---|
| 3,856,646 A | 12/1974 | Moraru | |
| 5,055,169 A | 10/1991 | Hock et al. | |
| 5,296,120 A | * 3/1994 | Bennett et al. | ........ 204/196.33 |
| 5,312,526 A | 5/1994 | Miller | |
| 5,368,709 A | 11/1994 | Utklev | |
| 5,755,945 A | 5/1998 | Kristiansen | |
| 6,117,295 A | * 9/2000 | Bjerke et al. | ................ 204/515 |
| 6,126,802 A | * 10/2000 | Utklev | ........................ 204/515 |
| 6,270,643 B1 | 8/2001 | Finnebraaten | |

* cited by examiner

Primary Examiner—Arun S. Phasge
(74) Attorney, Agent, or Firm—Earl H. Baugher, Jr.

(57) ABSTRACT

A configuration and treatment for degrading porous material, e.g., concrete, brick, or other masonry material, via rapid, efficient electro-osmosis. One application carries dehydration to an extent that it weakens a structure for demolition by significantly dehydrating its structural material. A durable, dimensionally stable anode is affixed to the structure and attached to a wire from a DC power supply. The anode is composed of a valve metal substrate with a semiconductive coating of a precious metal, cement or ceramic. Connection to a cathode through the power supply completes the circuit. A DC voltage is applied to the concrete structure by cycling a pro-specified pulse train from the power supply. One pulse train consists of an initial positive pulse followed by a shorter duration negative pulse and ends with a short off period before the pulse train is reinitiated. The cycle continues until the porous material has been determined to be sufficiently degraded.

18 Claims, 7 Drawing Sheets

CONFIGURATION AND ELECTRO-OSMOTIC PULSE (EOP) TREATMENT FOR DEGRADING POROUS MATERIAL

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Bea Shahin at 217 373-7234 or Phillip Stewart at 601 634-4113.

BACKGROUND

Groundwater intrusion through a building's foundation can cause serious damage. In addition to increased concrete deterioration and accelerated rebar corrosion, basement dampness can ruin expensive electrical and mechanical equipment, which is often located in basement space, and can increase maintenance requirements through frequent repainting or cleaning to combat mold growth. Furthermore, the intruding water raise the interior relative humidity thereby accelerating the corrosion rate of mechanical equipment in the area and creating unacceptable air quality and concomitant health problems due to the rapid growth of bacteria and mold.

In selective problem areas, the usual approach to the treatment of water intrusion problems is to 'trench and drain'. In other words, to excavate and expose the wall area and the base of the foundation, to replace waterproofing on the wall surface, and to install a drain tile system around the building or affected area. Other areas, such as floors, are untreatable using conventional methods.

Electro-osmosis has origins in 1809, when F. F. Reuss originally described an experiment that showed that water could be forced to flow through a clay-water system when an external electric field was applied to the soil. Research since then has shown that flow is initiated by the movement of cations present in the pore fluid of clay, or similar porous medium such as concrete, brick, and cementitious construction materials; and the water surrounding the cations moves with them. The basic physics and chemistry of electro-osmosis can be found in several textbooks and treatises. Glasstone, S., *Textbook of Physical Chemistry*, 2d ed., D. Van Nostrand Company, Inc., Princeton, N.J., 1946. Tikhomolova, K. P., *Electro-Osmosis*, Ellis Horwood Limited, Chichester, West Sussex, England, 1993.

Electro-osmosis is typically used to solve the problem of groundwater intrusion, which can cause serious damage to a building's foundation and interiors. As noted above, basement dampness, can ruin expensive electrical and mechanical equipment, which is often located in basement space; can increase maintenance requirements through frequent repainting or cleaning to combat mold growth; and can make affected areas uninhabitable or even unusable due to poor air quality. Electro-Osmotic Pulse (EOP) technology typically offers an alternative that can mitigate some water-related problems from the interior of affected areas without the cost of excavation. Examples of such systems are described below.

In one system, humidity is removed from a damp structure by positioning electrodes within the structure and applying a D.C. voltage across them. U.S. Pat. No. 3,856,646, *Methods and Electrodes for the Drying of Damp Buildings*, to Morarau, Dec. 24, 1974.

In another system, chloride ions are removed from concrete by embedding an anode in an electrolyte and establishing an electric current between the anode and the concrete structure in order to avoid corrosion of the concrete's reinforcing means, typically steel rebar. U.S. Pat. No. 5,296,120, *Apparatus for the Removal of Chloride from Reinforced Concrete Structures*, to Bennett et al., Mar. 22, 1994.

Another system discloses a process for changing the bond strength between concrete and its steel reinforcement by passing DC current through the concrete. U.S. Pat. No. 5,312,526, *Method for Increasing or Decreasing Bond Strength Between Concrete and Embedded Steel, and for Sealing the Concrete-to-Steel Interface*, to Miller, May 17, 1994.

Still another method used to eliminate humidity from concrete uses electro-osmosis to pass current pulses in a predetermined pattern through the concrete. U.S. Pat. No. 5,368,709, *Method and Apparatus for Controlling the Relative Humidity in Concrete and Masonry Structures*, to Utklev, Nov. 29, 1994.

A method that claims improvement over existing methods by choice of a narrow range of relationships among the three pulse durations of the pulse train provides longer anode life while optimizing the process of dehydration. U.S. Pat. No. 5,755,945, *Method for Dehydrating Capillary Materials*, to Kristiansen, May 26, 1998.

An improvement over previous methods claims to increase anode life while optimizing dehydration and the time to effect it. It uses a specific pulse train in which the positive pulse width is much greater than the negative pulse width that is, in turn, greater than the off period. U.S. Pat. No. 6,117,295, *Method for Dehydrating a Porous Material*, to Bjerke, Sep. 12, 2000.

A method that claims to be an improvement over the '709 patent provides a control unit to control the pulse width of individual pulses by monitoring characteristics of the energizing source. U.S. Pat. No. 6,126,802, *Method and Device for Regulating and Optimizing Transport of Humidity by Means of Electroosmosis*, to Utklev, Oct. 3, 2000.

A more recent patent proposes a solution to overcome the disadvantage of the '709 patent when used to dehumidify steel-reinforced structures. It specifically prevents the deterioration of the reinforcing steel by providing a second voltage to the reinforcement steel in addition to the typical electro-osmosis configuration of the '709 patent and its predecessors. U.S. Pat. No. 6,370,643 B1, *Method for Effecting Fluid Flow in Porous Materials*, to Finnebriaten, Aug. 7, 2001.

An Electro-Osmotic Pulse (EOP) system is realized by installing anodes (positive electrodes) in the interior wall, floor or ceiling of the structure and cathodes (negative electrodes) in the soil exterior to the structure. Due to the extreme electrochemical environment surrounding the anode, special material and geometry requirements may be placed on an anode intended to be used for other than "trickle current" loads or extended periods, or both.

Durable, dimensionally stable anodes are a recent development in anode technology. They have excellent characteristics to include: low resistivity, very low dissolution rates, long life, durability, and corrosion resistance. Durable, dimensionally stable anodes are also referred to as semiconductive anodes. Durable anodes that are classified as dimensionally stable generally consist of a valve metal substrate such as niobium, tantalum, titanium or alloys thereof, with a catalytic coating consisting of precious metal(s), most often from the platinum metal group, and often in oxide form in combination with valve metal oxides as a mixed metal oxide.

Although conventionally used for "humidity control," a rather unconventional use for EOP systems in porous structures lies in taking water (moisture) removal to extremes, i.e., removing sufficient water to weaken the structure in that a minimum amount of moisture is needed to hold together the porous structure. For example, concrete deteriorates rapidly when significant moisture is removed.

Conventionally, several methods are used to demolish concrete or other masonry structures. Some require a mechanical device or explosives to remove the concrete or masonry material or to dismantle the structure. Most if not all of these processes are noisy, dusty and potentially dangerous to the workers involved.

In a preferred embodiment of the present invention, an objective heretofore undesired in prior patents is attained, i.e., concrete or masonry is treated by electro-osmosis until the concrete or masonry and the structure it is supporting is weakened.

SUMMARY

Provided is a method for controlling the amount of water (moisture) in porous (capillary) materials via incorporation of a durable, dimensionally stable anode in an Electro-Osmotic Pulse (EOP) system. Employing such a system yields water transport that is both more efficient and more reliable than conventional methods. Additionally, flexibility of design is inherent in the use of the durable, dimensionally stable anodes that may be shaped easily to meet specific requirements, thus also facilitating their installation. These anodes may also handle higher current levels than similarly sized non-durable anodes which means that they are able to be used in a broader range of applications.

Alternative designs may be employed by using semiconductive coatings applied to valve metal substrates to produce a durable, dimensionally stable composite anode. Anode coatings may be one or more precious metals, precious metal oxides, valve metal oxides, or any combination of these. The resulting durable, dimensionally stable anode may include metallic, cement or ceramic coated anodes that are chemically and electrochemically stable. The use of durable, dimensionally stable anode composites has three advantages:

the anode does not change shape overtime;
the anode may be manufactured easily and inexpensively in any shape, such as wire, a cylinder, an elongated cylinder, or a torus; and
the chemically inert, typically iridium based, anodes are impervious to degradation.

These three advantages allow durable, dimensionally stable anodes to be placed where conventional anodes fail. Conventional EOP systems use "ionic" or "massive" anodes that are consumed over time, thereby separating from the surrounding material while exhibiting decreasing current transfer, eventually reduced to zero. Since the dimensionally stable anode does not change shape, this allows a wider variety of placement options and a practically unlimited lifetime in this application. The wide range of available shapes greatly increases design flexibility. Since iridium and its metal oxide are two of the most chemically inert materials, they are the materials most often chosen for use in the manufacturing of dimensionally stable anodes. Unlike materials conventionally used for EOP anodes, it will not degrade if solvents and many other chemicals are spilled on the floor or wall in which the anodes have been installed. Specifically, iridium based anodes may be employed in both chlorine and oxygen rich environments.

Further, a durable, dimensionally stable anode increases the efficiency of an EOP system, enabling higher current densities for the same anode geometry or reduction in the size of the anode for a given current density.

Employing conductive grouts with a durable, dimensionally stable anode increases the anode's effective surface area, permitting more current to be transferred while reducing any impedance mismatch effects due to high current densities at the anode-media interface. In a conventional humidity control task, employing durable, dimensionally stable anodes and conductive grouts allows the interior surface moisture to be reduced and maintained for the long term below 55% relative humidity (RH). At this level of RH, growth of mold and bacteria is reduced substantially, leading to improved indoor air quality.

A preferred embodiment of the present invention provides a method of controlling the movement of water (moisture) through porous (capillary) materials by electro-osmosis. It specifically includes inserting a durable, dimensionally stable anode in porous material containing moisture. The durable, dimensionally stable anode comprises a valve metal substrate with a semiconductive coating of a precious metal, cement or ceramic material. Also provided is a cathode located in an area outside of the porous material. A voltage is applied across the durable, dimensionally stable anode and cathode thereby creating an electromagnetic field in the porous material that causes cations and associated water molecules to move from the durable, dimensionally stable anode to the cathode.

In a specific embodiment of the present invention, an electro-osmotic system employing durable, dimensionally stable anodes inserts an electric field in select parts of a structure composed of porous material in a pre-specified pattern and over a pre-specified cycle for the purpose of weakening it to facilitate its demolition. The electric field establishes an osmotic outward flow of moisture from within the structure to which it is applied.

The system operates with pre-specified parameters including, but not limited to, a pre-specified pulse train of energy at a pre-specified amplitude level in a pre-specified cycle for a pre-specified time. The pre-specified parameters are determined by relating measurements, e.g., resistivity, taken from the structure and its surrounding environs to known data. In its normal mode of operation, the system is operated at a level that eliminates the possibility of damaging electrical shock to workers installing and operating it.

The pre-specified pulse train comprises a first positive DC voltage pulse of a first pre-specified duration, a second negative DC voltage pulse of a second pre-specified duration, and a zero DC voltage period of a third pre-specified duration. To attain its goal of reducing the level of shock hazard to workers in its normal mode of operation, the system operates at a nominal voltage of 40 V DC or less with pulse widths in the 1–60 second range. In a preferred embodiment, the first pulse is a positive pulse with a greater pulse width than the second negative pulse. The off period, or zero-voltage pulse, normally is of a longer duration than the negative pulse. This pulse train is continued until the porous material is determined to be sufficiently dehydrated to weaken the structure for demolition.

The system, in its most basic configuration comprises durable, dimensionally stable anodes in electrical communication with the structure, cathodes that complete a circuit between the anode and the power supply and a pathway between each anode and its corresponding cathode to carry energy from an external source to create the electric field that establishes an electro-osmotic flow of moisture from the structure. To optimize the life of anodes selected for the process, it is advantageous to employ durable dimensionally stable anodes, e.g., any of those built using a process detailed in U.S. Pat. No. 5,055,169, *Method of Making Mixed Metal Oxide Coated Substrates*, to Hock et al., Oct. 8, 1991, incorporated herein by reference. The system is operated within pre-specified parameters including but not limited to: a pre-specified pattern of disposition of the anodes and cathodes within the structure, energy in the form of a pulsed DC voltage at a pre-specified voltage level with a pre-specified cycle of pulses, i.e., a repeating pulse train having a pre-specified number of pulses of a pre-specified type and pre-specified pulse duration.

The most common type of porous material targeted for weakening is concrete, including concrete reinforced with steel, although other types of durable porous material, such as brick, concrete block, and composite masonry material, may also be targeted. In one embodiment, the cathode is a rod in electrical communication with the earth and the anode is an electrically conducting wire embedded in the structure. The anode may be electrically connected to the structure via an electrically conducting coating on the surface of the structure.

In an alternate mode, the system may be operated to provide a current of at least 400 mA/ft$^2$ of surface area of the anode to induce the formation of acid, or acids, in the porous material. Also provided is a method of implementing the system.

The method of an embodiment of the present invention for weakening a structure using an electro-osmotic system operated at a voltage level that insures worker safety, comprises:

measuring selected parameters of the structure and its surrounds;

comparing the selected parameters to known data;

establishing operating parameters of the electro-osmotic system;

connecting the electro-osmotic system to porous material in the structure in accordance with the established operating parameters; and establishing an osmotic flow of moisture from within the porous material using the established operating parameters to operate the electro-osmotic system.

An alternative method involves applying a significantly higher voltage to the porous material to enable formation of an acid or acids within the porous material. The acids, in turn, degrade the material from within, thereby degrading the structure.

Advantages of a specific embodiment of the present invention employed to facilitate demolition include:

less energy applied to effect demolition;

less dust and debris presented to the atmosphere;

lower overall cost;

less danger to the employees and passersby;

noiseless; and requires workers that are easily trained and who do not need specialized skills.

DETAILED DESCRIPTION

Figure 1:
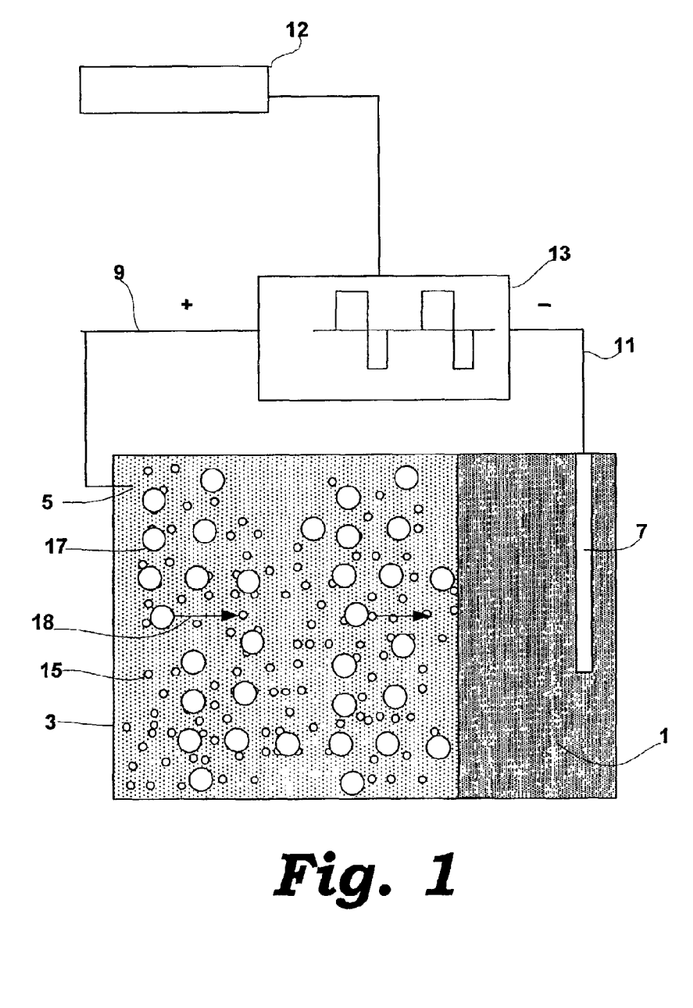
FIG. 1 is a schematic diagram of elements used in a preferred embodiment of the present invention.

Refer to FIG. 1. In a specific embodiment, the present invention facilitates electro-osmosis by inserting durable, dimensionally stable anode wires 5, such as the durable dimensionally stable anode wires that may be produced via the process detailed in the '169 patent noted above, into the concrete 3 that may be part of a structure comprising porous material, for example, a concrete structure to be demolished, and places cathode rods 7 in the soil 1 directly outside of that structure. The durable, dimensionally stable anode wire 5 is embedded in the concrete 3, e.g., using mortar, and the cathode rod 7, typically a copper-clad steel ground rod, is embedded into the soil 1. As depicted, the cathode rod 7 may be placed a short distance, e.g., 2 meters, from the concrete 3. Hard wires 9, 11 are used to form the circuit containing the durable, dimensionally stable anode wire 5, the cathode rod 7 and a DC power supply 13 in turn fed by an electrical power source 12. The number of durable, dimensionally stable anode wires 5 and cathode rods 7, and placement thereof, m is determined from an initial resistivity test of the concrete 3 and soil 1. The objective is to achieve a pre-specified current density to create an electric field strength in the concrete 3 sufficient to overcome the force exerted by the hydraulic gradient on the water molecules 17 enclosed therein. When the system is energized, the cations 15 (e.g., Ca++) and water molecules 17 in the concrete flow in the direction of the arrows 18 towards the cathode rod 7, thus "de-watering" the concrete in the structure.

Refer to Table 1 below for practical limits on operating current over time for the durable, dimensionally stable anode. It is expressed in current per area of contact, such as Amps (A) or milliamps (mA) current per square meter (m$^2$) or square feet (ft$^2$) of anode in contact with the porous material, i.e., electrode (anode) current density, A/m$^{2-}$ or mA/ft$^2$. Note that the anode current density may achieve a destructive objective on the porous material around the anode if maximum current density or time of application, or both, is exceeded. This is discussed below in relation to the formation of acids in the porous material.

TABLE 1

Anode Operating Parameters

| Operating Duration | Current Density on Anode $A/m^2$ $(mA/ft^2)$ | Current 1.6 mm dia. wire mA/m (mA/lineal ft) |
|---|---|---|
| two weeks | 4.4 (400) | 21.3 (6.5) |
| six months | 0.44 (40) | 2.1 (0.65) |
| projected life | 0.22 (20) | 1.07 (0.33) |

The required current density depends on the initial moisture content in the porous material. Assuming the application of anode current density as provided in Table 1, a practical maximum current density for a typical concrete structure is provided in Table 2. The values in Table 2 are derived by dividing the values of Table 1, i.e. current density capacity of the 1.6 mm (¹⁄₁₆") diameter wire current density limit per lineal meter (or lineal feet) by an assumed maximum area that one meter (or one foot) of the anode wire is able to treat. For treating high moisture content concrete (>30% water), empirical measurements indicate 0.92 $m^2$ (3.0 $ft^2$) of concrete may be addressed by a lineal meter (3.3 ft) of anode wire and 1.8 $m^2$ (6.0 $ft^2$) may be addressed by a lineal meter (3.3 ft) for low moisture concrete (<30% water). Moisture measurements may be taken with a PROTI-METER.

TABLE 2

Current Density to Achieve Effective Treatment of Concrete

| Initial Moisture Content of Concrete surveyed at 2.5 cm & 7.6 cm depth | Two Weeks $mA/m^2$ $(mA/ft^2)$ | Six Months $mA/m^2$ $(mA/ft^2)$ | Expected life 20 yrs+ $mA/m^2$ $(mA/ft^2)$ |
|---|---|---|---|
| >30% | 23.7 (2.2) | 2.4 (0.22) | 1.2 (0.11) |
| <30% | 11.9 (1.1) | 1.2 (0.11) | 0.6 (0.06) |

Figure 2:
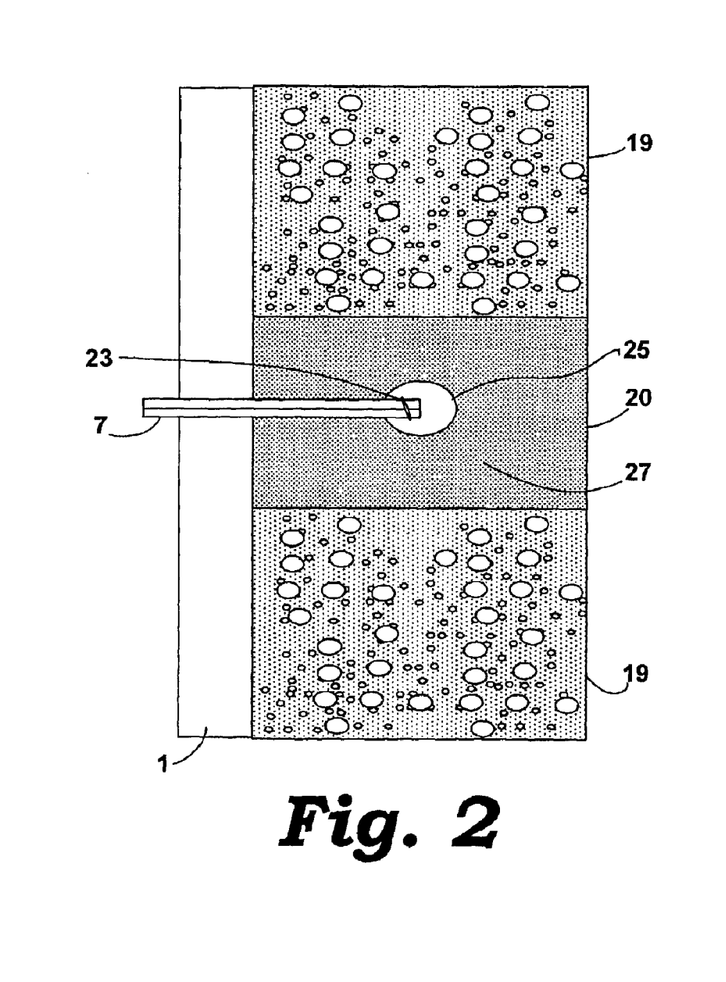
FIG. 2 is a schematic diagram showing the installation of the cathode through a concrete wall.

Refer to FIG. 2. Because a good earth ground is not always readily accessible, a borehole 20 may be drilled through the wall 19 of the structure to be demolished. The cathode rod 7 which may be a copper clad steel rod, or rebar, typically of one-inch diameter is inserted in the borehole 20, together with a cathode wire 23 suitably attached to the free end of the cathode rod 7 and encapsulated with epoxy 25 as insulation from the concrete. The cathode rod 7 may extend from and through the surrounding existing soil 1 to the wall 19 that will be demolished. Not shown in FIG. 2, but understood, is the cathode wire 23 extending from the wall 19 to where it is joined to the external DC power supply 13. Encapsulating the wall 19 abutting the borehole, the inserted portion of the cathode rod 7 and the insulating compound 25 is epoxy 27 used to bond and seal the borehole 20 in the concrete wall 19.

Figure 3:
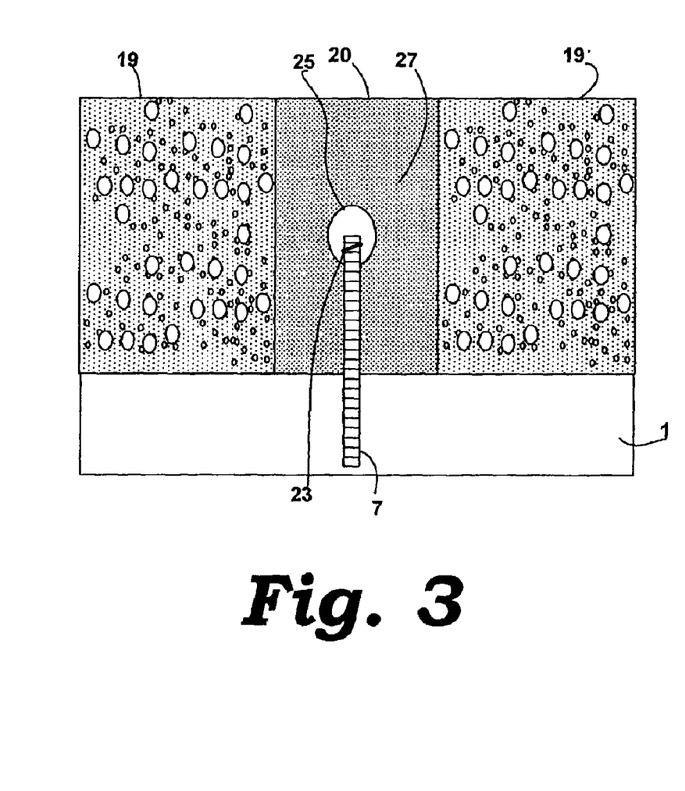
FIG. 3 is a schematic diagram showing the installation of the cathode through a concrete floor.

Refer also to FIG. 3, providing a view similar to FIG. 2 but for a concrete floor poured above a suitable base of gravel and soil 1.

Figure 4A:
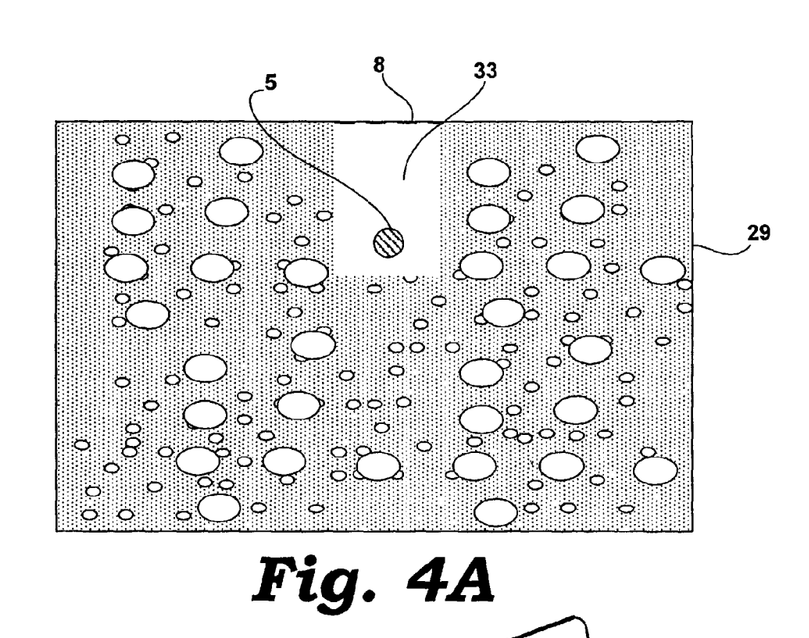
FIG. 4A is a schematic diagram showing the installation of a durable, dimensionally stable wire anode into a concrete wall or floor.
Figure 4B:
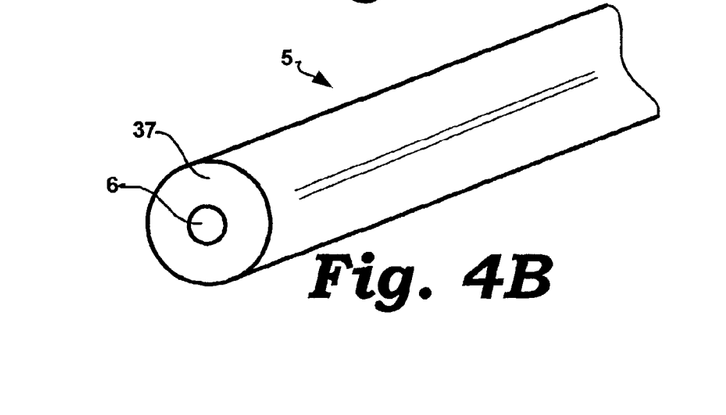
FIG. 4B is an enlarged perspective view of the durable, dimensionally stable anode shown in FIG. 4A.

A durable, dimensionally stable anode wire 5 is shown in perspective detail in FIG. 4B. Refer to FIG. 4A in which the durable, dimensionally stable anode wire 5 of FIG. 4B is depicted in use. Non-shrink grout 33 extends around the durable, dimensionally stable anode wire 5 located within a previously formed groove 8 in the concrete floor 29. The durable, dimensionally stable anode wire 5 consists of a base material 6, typically titanium, and an electrically conducting oxide layer such as a conductive ceramic coating 37. The electrically conductive ceramic coating 37 may consist of a dual phase mixture of iridium, tantalum and titanium oxides. Although the exact composition for this ceramic coating 37 may vary, it may generally comprise a mixed metal oxide film incorporating a dual phase mixture of $TiO_2$ (rutile) and $RuO_2$ or $IrO_2$, or both. It is highly desirable that this current conducting ceramic coating 37 have a resistivity less than 0.002 ohm-centimeter ($\Omega$-cm) and bond strength greater than 50 Megapascals (MPa). This ceramic-coated durable, dimensionally stable anode wire 5 is desired to be chemically inert and the electrically conductive ceramic coating 37 dimensionally stable. The durable, dimensionally stable ceramic anode wire 5 should be able to sustain a current density of 100 ampere/meter (A/m) in an oxygen-generating electrolyte at 65° C. (150° F.) for 20 years as described in the '169 patent, to maintain necessary current carrying capacity in use. Other types of durable, dimensionally stable anodes, including those having different conductive coatings, may be used. One such coating, described in the '169 patent, is an electrically conducting coating that is able to sustain a current density of approximately 150 $A/m^2$ of exposed coating surface in fresh water electrolyte for at least 75 hours without a significant increase in a voltage level required to maintain that current density.

Figures 5, 6, 7:
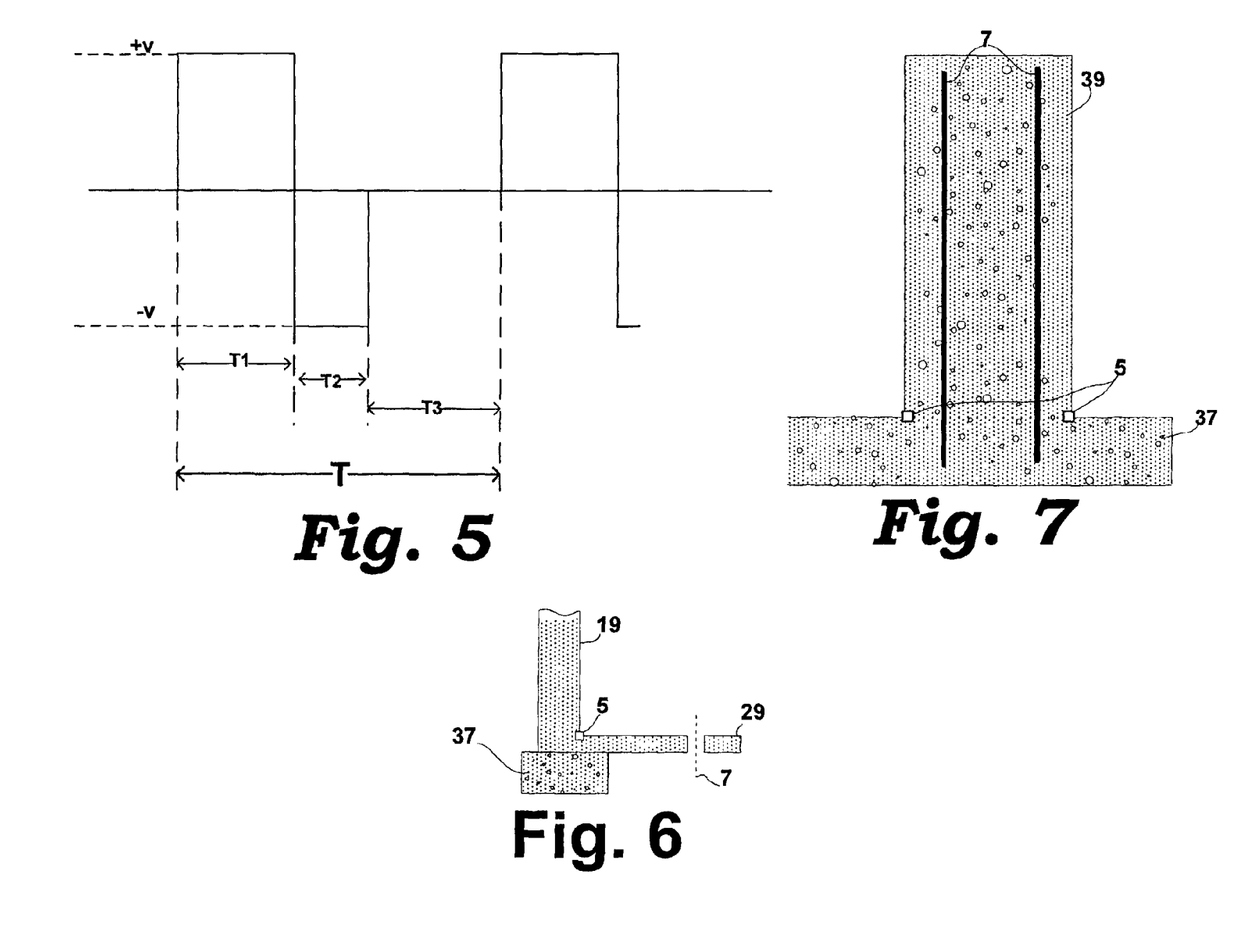
FIG. 5 is a diagram of the voltage waveform used in a preferred embodiment of the present invention.
FIG. 6 illustrates a typical electro-osmotic pulse (EOP) installation of the present invention in a cut away view.
FIG. 7 illustrates an EOP system of one embodiment of the present invention utilizing reinforcing steel as the cathode.

Refer to FIG. 5. The operating cycle of the DC power supply 13 is represented by a positive pulse, a negative pulse, and an off period having time durations of $T_1$, $T_2$, and $T_3$, respectively. T is the total elapsed time for one operating cycle. As a result of the application of this energy in this manner, the pore fluid in the concrete moves in the direction of the cathode rod 7. Typically, the positive voltage pulse has the longest pulse width of $T_1$ and the negative voltage pulse's width of $T_2$ is even shorter than the off period, $T_3$. In some applications, the pulse width, $T_1$, of the positive pulse might equal T, representing the degenerative case of a constant direct-current voltage of amplitude V being applied. The amplitude, V, and pulse durations of the pulse train are application dependent. Generally, assuming significant moisture within the concrete, the rate of moisture removal is directly proportional to the voltage, the greater the voltage the greater the rate of moisture removal and drying.

Refer to FIG. 6. A concrete wall 19 and concrete floor 29 each have the cathode rod 7 inserted as depicted in FIG. 3 and the durable, dimensionally stable anode wire 5 as depicted in FIG. 4A. The durable, dimensionally stable anode wire 5 is in a groove at the junction of the wall 19 and floor 29. As shown, the durable, dimensionally stable anode wire 5, surrounded by grout 33, is placed at a depth of about 38 mm (½") into the floor 29.
Preferably, grout 33 forms a channel of a width of about 13 mm (½").

In addition, a conventional concrete footing 37 is located below ground level under the wall 19. By installing the durable, dimensionally stable anode wire 5 in the juncture between the wall 19 and floor 29, both the wall 19 and floor 29 may be energized by one durable, dimensionally stable anode wire 5. The cathode 7, preferably having a length of about 60-120 cm, is inserted through the concrete floor 29, having suitable insulating epoxy encapsulating it for the length of its insertion in the floor 29, and is spaced about 60 cm from the durable, dimensionally stable anode wire 5.

Refer to FIG. 7 depicting an EOP system utilizing reinforcing steel as the cathode rod 7 in a concrete column 39 installed above a concrete footing 37. This footing 37 provides a base support for the column 39, as would be used in a structure, e.g., a building or bridge. The durable, dimensionally stable anode wire 5 is placed at the intersection of the column 39 and footing 37 as is also shown in FIG. 6.

Figure 8:
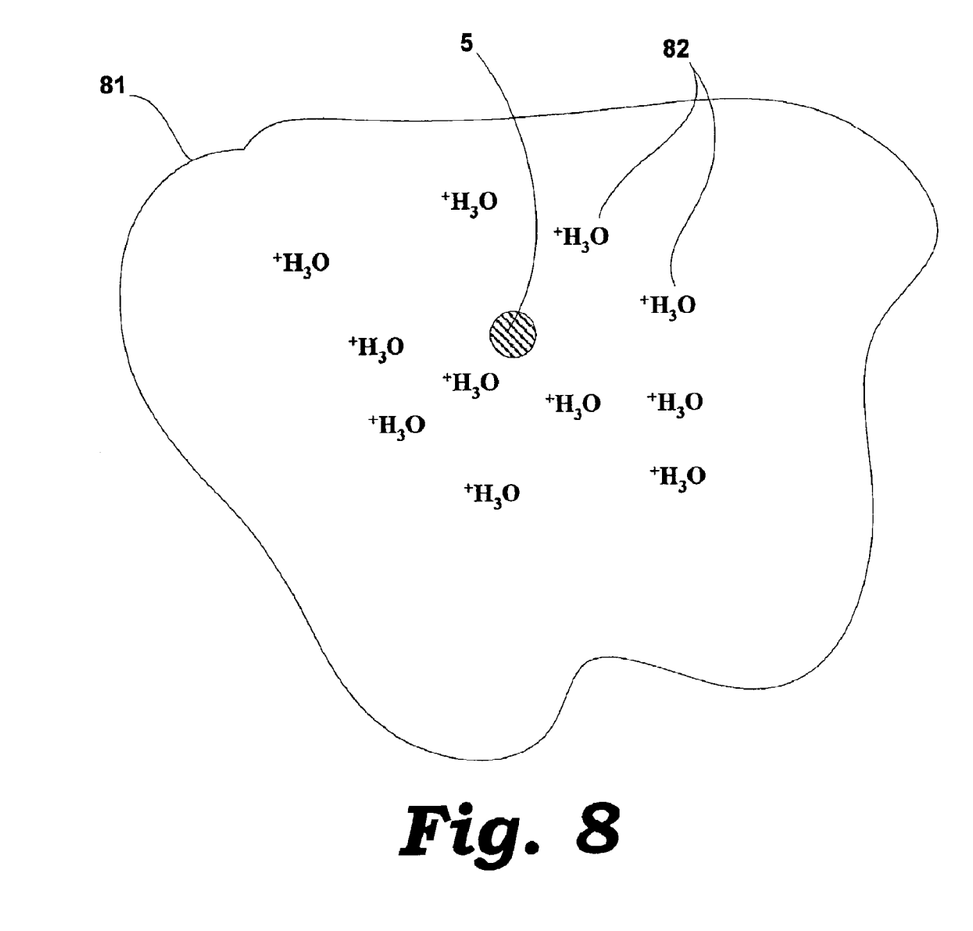
FIG. 8 schematically illustrates an alternate embodiment of the present invention with a durable, dimensionally stable anode and generated acids.

Refer to FIG. 8 depicting what occurs when, using an alternative embodiment, a high-energy pulse that may be considerably longer in duration than typical is applied. This high-energy pulse generates the formation of acid 82 that attacks the concrete in the area 81 immediately around the durable, dimensionally stable anode wire 5. When the operation of the electro-osmotic system is at a high current density, i.e., greater than 4.4 A/m² (400 mA/ft²) of anode surface area, i.e., 0.2 mA/cm (6.5 mA/ft) for a 0.8 mm (0.032") diameter durable, dimensionally stable anode wire 5, oxidation of hydroxyl ions, OH⁻, occurs, producing two molecules of water (i.e., four for each four hydroxyls produced), one oxygen molecule and four electrons that are transferred via the system's established conductive (metallic) path to the cathode rod 7. The reaction may be represented by:

$$4OH^- \rightarrow 2H_2O + O_2 + 4e^- \tag{1}$$

$$6H_2O + E \rightarrow 4(^+H_3O) + O_2 \tag{2}$$

where E is the energy supplied from electrolysis at the durable, dimensionally stable anode wire 5.

With the process depicted in FIG. 8, hydroxyls and water molecules are employed in the vicinity of the durable, dimensionally stable anode wire 5, increasing concentration of hydrogen ions and reducing pH upon formation of acid 82 that eventually degrades the concrete structure. In principle, the configuration of the durable, dimensionally stable anode wires 5, cathode rods 7 and DC power supply 13 is similar to previously described embodiments. However, spacing and sizing of the respective elements, i.e., durable, dimensionally stable anode wires 5, cathode rods 7, and DC power supply 13, is adjusted to achieve the higher current densities required to achieve the oxidation of the hydroxyl ions and electrolysis of water molecules 17. Likewise, the voltage levels used and the pulse widths are appropriately adjusted, i.e., the voltage may be increased as well as the pulse width of the energizing pulses with the off-cycle duration approaching zero to quickly oxidize the generated hydroxyl ions.

Figure 9:
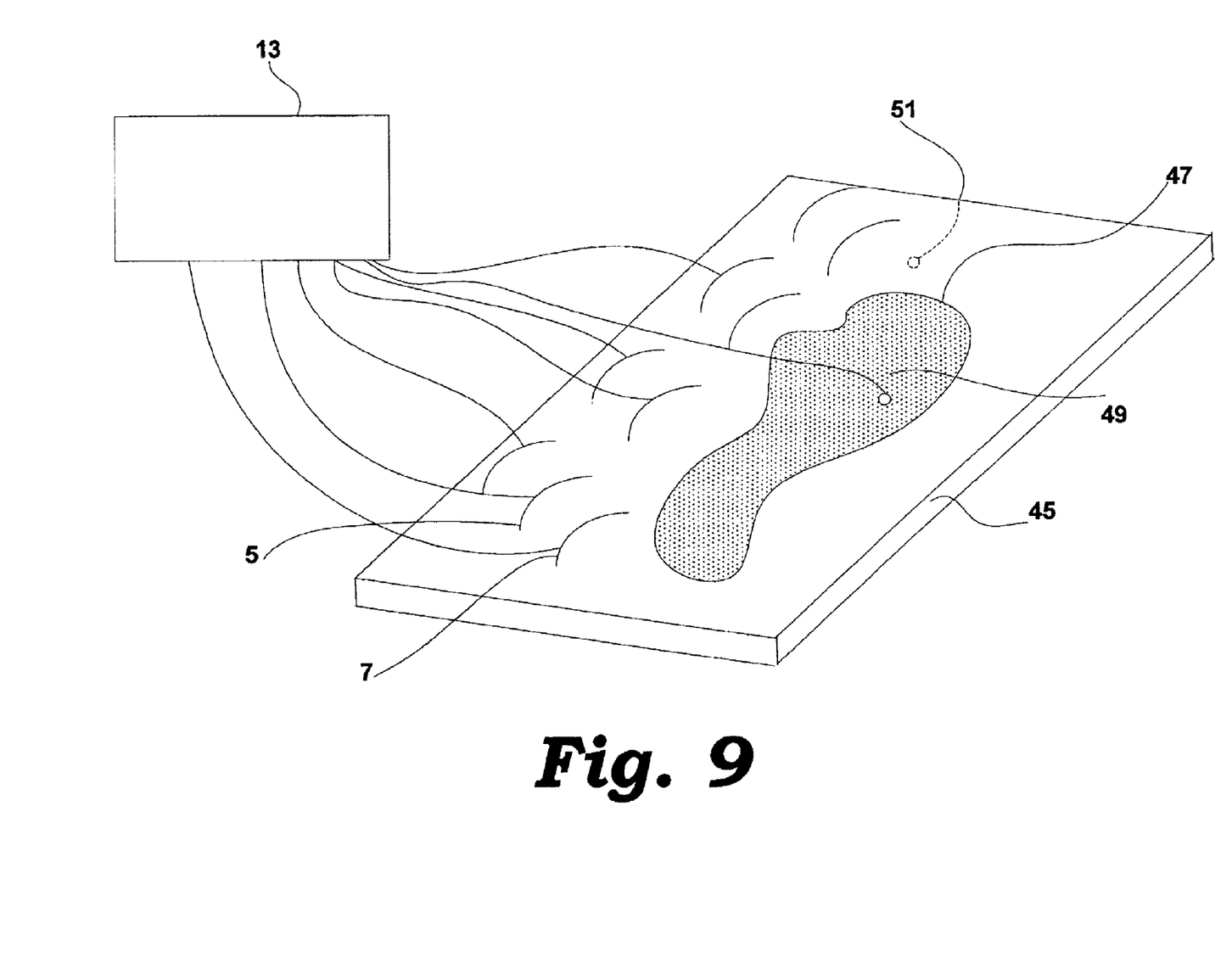
FIG. 9 depicts a perspective view of an arrangement of cathodes or durable, dimensionally stable anodes in a preferred embodiment of the present invention for an EOP demolition of a concrete slab.

Refer to FIG. 9 in which a DC power source 13 is connected to durable, dimensionally stable anode wires 5 and cathode rods 7 (not shown in boreholes accessing a soil ground, but implied) in a concrete slab 45. This configuration facilitates pre-specified sequential demolition of structural elements. Although not shown, the durable, dimensionally stable anode wires 5 and cathode rods 7 may be placed on opposite surface sides of selected areas of the slab 45 to allow for weakening in place without inducing weakening in adjacent structural elements. The area 47 represents an electrically conductive coating that may be applied to the slab 45 to facilitate conduction. Using this coating as a durable, dimensionally stable anode or cathode may be accomplished by placing a wire from the DC power source 13 to one side of the coating 49 and a wire to another terminal 51 on the surface of the concrete slab 45 opposite that with the coating 49.

Figure 10:
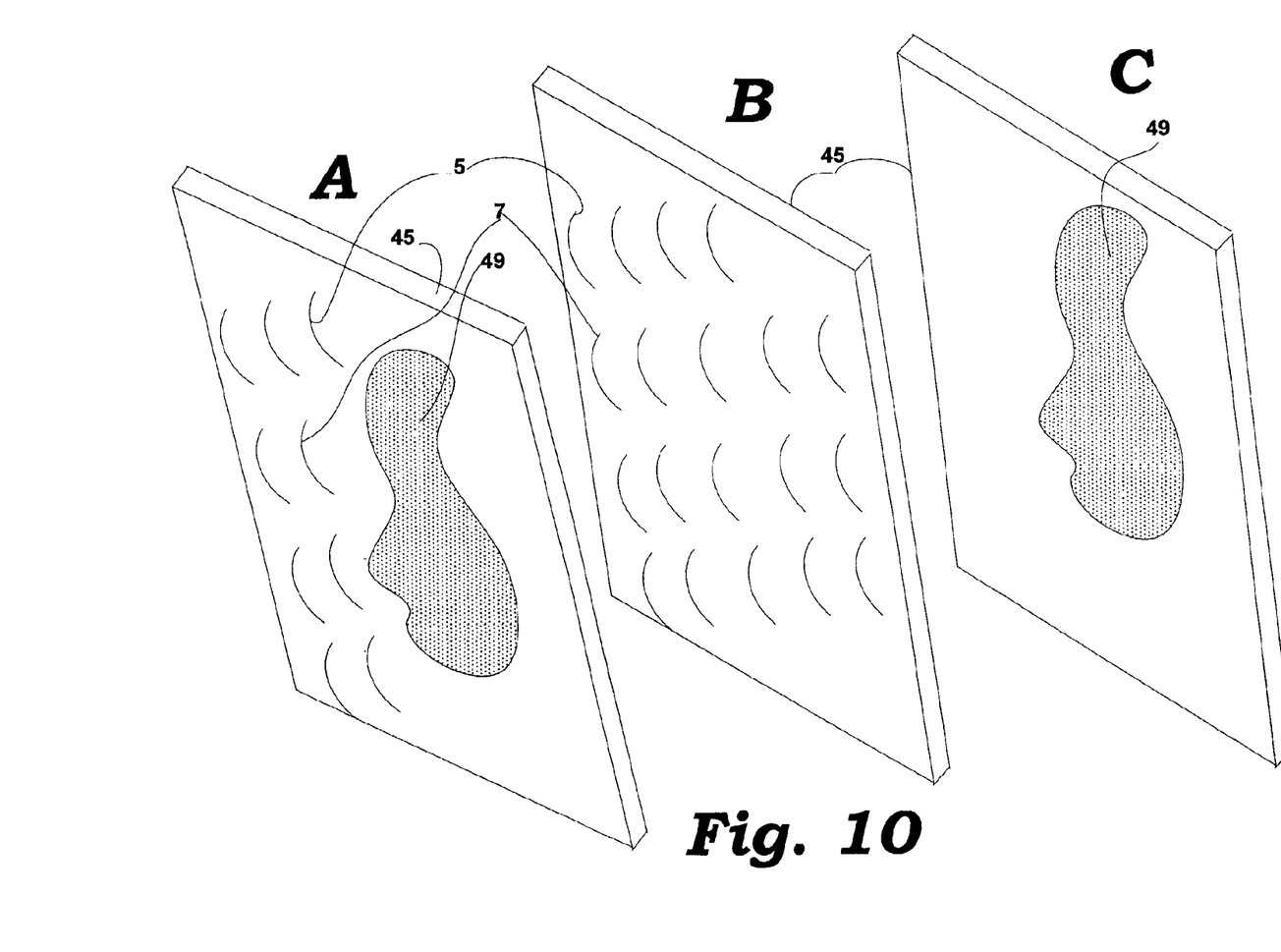
FIG. 10 shows three separate arrangements of electrodes as used in a preferred embodiment of the present invention.

Refer to FIG. 10. The three methods of connecting to a concrete structure described above are illustrated side by side. The first method, as illustrated in slab A, involves connecting durable, dimensionally stable hard anode wires 5 and rods 7 by embedding them in the concrete or providing an electrically conductive surface coating 49. Note that in any of the three examples, each side of the concrete slab may be configured differently, so that side 1 may be configured as shown in FIG. 10A and side 2 may be configured as shown in FIG. 10B where only durable, dimensionally stable hard anode wires 5 and rods 7 are used. Finally, all connections to the slab may be via a conductive coating 49 as shown in FIG. 10C.

Although specific types of electro-osmotic configurations are discussed, other similar configurations or methods, including those that may have only some of the constituents or steps used in the above examples, may be suitable for dehydrating a structure or weakening a structure for demolition and thus fall within the ambit of a preferred embodiment of the present invention as provided in the claims herein.

The abstract is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims, 37 CFR § 1.72(b). Any advantages and benefits described may not apply to all embodiments of the invention.

We claim:

1. A method for weakening a structure composed at least in part of porous material via use of an electro-osmotic system, comprising:
    measuring selected parameters of said structure and said structure's surrounding environment;
    comparing said selected parameters to known data;
    establishing operating parameters of said electro-osmotic system;
    connecting said electro-osmotic system to at least part of said porous material in said structure in accordance with said established operating parameters; and
    establishing an efficient osmotic flow of moisture from within at least some of said porous portions of said structure using said established operating parameters to operate said electro-osmotic system,
    wherein said osmotic flow dehydrates at least part of said porous material in said structure, and
    wherein said dehydration causes weakening of said structure to facilitate demolition thereof; and
    terminating said osmotic flow of moisture upon attaining a pre-specified level of degradation of said structure.

2. The method of claim 1 incorporating said electro-osmotic system comprising at least one grounded cathode and at least one durable, dimensionally stable anode,
    wherein said anodes comprise a semiconductive coating applied to a valve metal substrate, and
    wherein said energy establishes at least an efficient osmotic flow of moisture towards said cathode.

3. The method of claim 2 further comprising connecting at least one said anode to said structure with a conducting grout.

4. The method of claim 1 further comprising establishing said electro-osmotic flow by employing said electro-osmotic system to apply a current of at least approximately 4.4 A/m² of surface of said anode to at least pail of said porous part.

5. The method of claim 1 further comprising establishing said electro-osmotic flow by employing said electro-osmotic system to apply a current of at least approximately 21.3 mA/m of lineal length of maid anode to at least part of said porous part,
    wherein said anode is a wire of approximate diameter of 1.6 mm.

6. The method of claim 5 further comprising placing said wire in a channel of approximately 13 mm width and depth of approximately 38 mm into said porous part and filling said channel with said conducting grout.

7. The method of claim 1 in which said at least part of said porous material is concrete.

8. The method of claim 1 further comprising employing said electro-osmotic system to apply a voltage sufficient to enable formation of a least one acid in said porous material,
wherein said acid formation facilitates weakening of said structure.

9. The method of claim 8 further comprising providing said voltage over a cycle having a duration, T, as a positive pulse of duration $T_1$, a negative pulse of duration $T_2$ and an off period of $T_3$,
wherein $T_1$ is greater than $T_3$ which is greater than $T_2$.

10. The method of claim 9 further comprising $T_1$ approaching T and each of $T_2$ and $T_3$ approaching zero.

11. A method facilitating weakening of a structure composed at least in part of porous material, comprising:
providing a system comprising:
at least one durable, dimensionally stable anode,
wherein said anodes comprise a semiconductive coating applied to a valve metal substrate, and
wherein said anodes are in electrical communication with at least part of said structure;
at least one cathode,
wherein said cathodes serve to complete a circuit between said anodes and at least one power supply; and
at least one pathway, each said pathway established to define pairs of said anodes and cathodes,
wherein said pathways at least conduct electrical energy that facilitates establishing an electro-osmotic flow of moisture from within said structure;
operating said system with pre-specified parameters by establishing:
a pre-specified pattern of disposition of said anodes and said cathodes;
at least one pre-specified cycle of applied energy;
at least one pulse of said applied energy in said pre-specified cycle;
at least one pro-specified type of said pulses; and
at least one pre-specified pulse duration for each said type of pulse,
wherein said pulses are provided as a DC voltage having at least one pre-specified voltage level, and
wherein said pro-specified parameters are selected with the objective of eliminating damaging electrical shock to workers installing and operating said system; and
terminating said operation of said system upon attaining a pre-specified level of degradation of said structure.

12. The method of claim 11 further comprising connecting at least one anode to said structure with a conducting grout.

13. The method of claim 11 further comprising establishing said electro-osmotic flow by employing said system to apply a current of at least approximately 4.4 A/m$^2$ of surface of said anode to at least part of said porous part.

14. The method of claim 11 further comprising establishing said electro-osmotic flow by employing said system to apply a current of at least approximately 21.3 mA/m of lineal length of said anode to at least part of said porous part,
wherein said anode is a wire of approximate diameter of 1.6 mm.

15. The method of claim 11 in which said porous material is concrete.

16. The method of claim 11 further comprising employing said system to apply a voltage sufficient to enable formation of at least one acid in said porous material,
wherein said acid formation facilitates weakening of said structure.

17. The method of claim 16 further comprising providing said voltage over a cycle having a duration, T, as a positive pulse of duration $T_1$, a negative pulse of duration $T_2$ and an off period of $T_3$,
wherein $T_1$ is greater than $T_3$ which is greater than $T_2$.

18. The method of claim 17 further comprising $T_1$ approaching T and each of $T_2$ and $T_3$ approaching zero.

* * * * *

UNITED STATES PATENT AND TRADEMARK OFFICE
CERTIFICATE OF CORRECTION

PATENT NO. : 6,919,005 B2
DATED : July 19, 2005
INVENTOR(S) : Michael K. McInerney et al

It is certified that error appears in the above-identified patent and that said Letters Patent is hereby corrected as shown below:

Title page,
Item [57], ABSTRACT,
Line 12, change the word "pro-specified" to -- pre-specified --.

Column 2,
Line 46, change "Finnebriaten" to -- Finnebraaten --.

Signed and Sealed this

Sixth Day of September, 2005

JON W. DUDAS
*Director of the United States Patent and Trademark Office*